(12) United States Patent
Gandhi et al.

(10) Patent No.: US 6,968,201 B1
(45) Date of Patent: Nov. 22, 2005

(54) METHOD AND APPARATUS FOR CONTROLLING REVERSE LINK INTERFERENCE RISE AND POWER CONTROL INSTABILITY IN A WIRELESS SYSTEM

(75) Inventors: Asif D. Gandhi, Summit, NJ (US); Lei Song, Woodbridge, NJ (US); Mathew Thomas, Scotch Plains, NJ (US); Stanley Vitebsky, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/413,036

(22) Filed: Oct. 6, 1999

(51) Int. Cl.⁷ ............................................. H04Q 7/20
(52) U.S. Cl. ................. 455/522; 455/63.1; 455/67.11; 455/67.13; 455/226.1; 455/226.3
(58) Field of Search ................................ 455/522, 501, 455/63, 67.3, 226.1, 226.3; 370/318; 375/296, 375/346

(56) References Cited

U.S. PATENT DOCUMENTS

| | | | |
|---|---|---|---|
| 5,604,730 A | | 2/1997 | Tiedemann, Jr. |
| 5,649,303 A | * | 7/1997 | Hess et al. ..................... 455/63 |
| 5,732,328 A | * | 3/1998 | Mitra et al. ................... 455/69 |
| 5,778,030 A | | 7/1998 | Bruckert et al. |
| 6,041,238 A | * | 3/2000 | Tanoue ........................ 455/452 |
| 6,154,659 A | * | 11/2000 | Jalali et al. ................. 455/522 |
| 6,167,240 A | * | 12/2000 | Carlsson et al. ............ 455/67.3 |
| 6,173,188 B1 | * | 1/2001 | Kim ............................. 455/522 |
| 6,181,738 B1 | * | 1/2001 | Chheda et al. ............... 375/224 |
| 6,192,249 B1 | * | 2/2001 | Padovani ..................... 455/453 |
| 6,445,686 B1 | * | 9/2002 | Hoffbeck et al. ........... 370/318 |

(Continued)

FOREIGN PATENT DOCUMENTS

| | | |
|---|---|---|
| EP | 0762688 | 3/1997 |

(Continued)

Primary Examiner—Temica Beamer
(74) Attorney, Agent, or Firm—Harness Dickey & Pierce, PLC

(57) ABSTRACT

A system and a method for reverse link power control in a wireless communications network generates power adjust commands for mobiles being served by a network base station in a centralized manner by considering overall system performance when an increased interference condition is detected. In one implementation, a base station power control processor adopts a modified reverse inner loop power control (RILPC) and/or a reverse outer loop power control (ROLPC) algorithm when an increased interference condition is detected. According to the modified RILPC algorithm, a percentage of power-up adjust commands which would normally be generated when $E_b/N_o$ measurements for served mobiles do not meet target $E_b/N_o$ levels are converted to power down-adjust commands, thereby forcing some mobiles to reduce transmit power, at least temporarily, to constrain interference. When the increased interference condition persists, the percentage of power-up adjust commands which are converted to power-down commands may be changed. According to the modified ROLPC algorithm, the power control processor adjusts target $E_b/N_o$ levels in a centralized manner based on an overall system state so that only a limited number of target $E_b/N_o$ levels are allowed to increase when frame erasures occur. By preventing a percentage of target $E_b/N_o$ level increases, at least temporarily, when frame erasures occur, a percentage of power up-adjust commands are avoided. Therefore, a similar effect to that achieved by the modified RILPC is achieved. In accordance with still a further implementation of the present invention, the modified RILPC algorithm may be used in combination with the modified ROLPC algorithm to provide greater resistance to increased interference conditions.

50 Claims, 4 Drawing Sheets

U.S. PATENT DOCUMENTS 6,493,541 B1 * 12/2002 Gunnarsson et al. .......... 455/69
6,587,510 B1 *  7/2003 Minami et al. ............. 375/285
6,603,746 B1 *  8/2003 Larijani et al. ............. 370/318

FOREIGN PATENT DOCUMENTS

EP          0917302       5/1999

* cited by examiner

METHOD AND APPARATUS FOR CONTROLLING REVERSE LINK INTERFERENCE RISE AND POWER CONTROL INSTABILITY IN A WIRELESS SYSTEM

BACKGROUND OF THE INVENTION

1. Field of the Invention

The present invention relates to the field of wireless communications.

2. Description of Related Art

In a spread spectrum communication system, such as the Code Division Multiple Access (CDMA) system specified in the IS-95 standard adopted by the U.S. Telecommunication Industry Association (TIA), a plurality of communication channels share the same radio frequency (RF) band, and are differentiated by unique codes. Each information signal to be transmitted is combined with an assigned code so that the signal appears as noise to a receiver which does not perform a corresponding de-spreading operation. Thus, in contrast to Time Division Multiple Access (TDMA) and Frequency Division Multiple Access (FDMA) techniques, which provide service to a plurality of mobiles using a single radio frequency (RF) band by assigning different time slots to mobiles and subdividing an RF band into a plurality of sub-bands respectively, the number of mobiles that a single cell/sector of a CDMA system can support at one time is not fixed, and instead is generally limited only by the degradation of service quality caused by interference from a other mobiles in the same or adjacent cells/sectors.

To increase network capacity, CDMA system architectures utilize reverse link (mobile to base station) transit power control techniques to adaptively set the transmit power of each mobile being served to the minimum level needed to maintain adequate performance. Such power control techniques include two main operations: (1) reverse inner loop power control (RILPC)—in which power adjustment commands are generated based on a comparison of reverse link call quality (typically represented as the ratio of energy per bit, $E_b$, to interference, $N_o$) for each mobile being served and a target quality value; and (2) reverse outer loop power control (ROLPC)—in which the target quality value for each served mobile is adjusted to maintain acceptable frame errors rates. More specifically, the base station continuously monitors reverse link $E_b/N_o$ for each mobile being served and, in accordance with RILPC, generates either a power up-adjust or down-adjust command at predetermined intervals, typically every 1.25 milliseconds, depending on whether reverse link $E_b/N_o$ is greater than a target $E_b/N_o$ value assigned to the mobile (indicating acceptable call quality) or less than the target $E_b/N_o$ value (indicating inadequate call quality). For ROLPC, the base station increases the target $E_b/N_o$ for a corresponding mobile when a frame error is received (i.e., an erasure frame) to ensure an acceptable frame error rate for the corresponding mobile. If a non-erasure frame is received, the base station lowers the target $E_b/N_o$. This process of adjusting target $E_b/N_o$ levels for each served mobile occurs once every frame, e.g., every 20 milliseconds, and attempts to maintain an acceptable erasure rate for served mobiles while constraining reverse link transmit power on a per call or individual mobile basis (i.e., in a distributed manner).

At certain load levels, the CDMA system may experience abrupt changes in power received at a base station, for example caused by a mobile which does not comply with transmit specifications or when a served mobile comes out of a fade. As another example, the base station will issue a large number of power up-adjust commands under extremely heavy loads, thereby resulting in a sharp increase in interference at the base station. Such a sharp increase in interference will lead to an even greater number of power up-adjust commands. Because many mobiles, particularly those at cell/sector boundaries, will not be able to transmit at the power level needed to overcome the resulting rise in interference, calls may be dropped if the situation persists. Because current reverse link power control techniques are designed to work on a per call or individual mobile basis in a distributed manner, without considering the impact on resulting overall system performance, current power control algorithms do not address the above-described situation.

SUMMARY OF THE INVENTION

The present invention is a system and a method for reverse link power control in a wireless communications network which, according to one embodiment, generates power adjust commands for mobiles being served by a base station in a system-based, or centralized, manner by considering overall system performance during power control, rather than solely considering the state of individual mobiles, when high interference conditions occur.

In one implementation, a power control processor of a wireless network base station adopts a modified RILPC algorithm upon detecting the onset of an increased interference condition. Such an increased interference condition may be detected, for example, by monitoring absolute and/or time-differential received signal strength indicator (RSSI) measurements, the ratio of power up-adjust commands generated during a time period to total power adjust commands generated over the time period, and/or decreasing call quality (e.g., decreasing $E_b/N_o$) for a large fraction of users. According to the modified RILPC algorithm, the power control processor converts a percentage of power up-adjust commands to power down-adjust commands to constrain interference at the base station and preserve overall service quality. More specifically, to prevent an abrupt increase in the number of power up-adjust commands when $E_b/N_o$ measurements do not meet target levels, a percentage of the power up-adjust commands which would normally be issued by the base station are converted to power down-adjust commands, thereby forcing some mobiles to reduce transmit power, at least temporarily, to constrain interference. If the increased interference condition persists, the percentage of power up-adjust commands which are converted to power down-adjust commands may be changed incrementally.

Although this modified RILPC algorithm may lead to a temporary decrease in reverse link quality for some mobiles, base station coverage is maintained and overall quality is improved by constraining rises in interference levels seen at the base station. Thus, power control is performed in a system-based, or centralized, manner during an increased interference condition by allowing call quality for individual mobiles to degrade so that overall system quality may be maintained. Furthermore, because power adjust commands are issued on a sub-frame basis (e.g., 16 power adjust commands per each 20 millisecond frame), converting a percentage of power up-adjust commands to power down-adjust commands will generally result in relatively few frame erasures. After the modified RILPC algorithm has constrained the interference rise, the power control processor returns to normal operation.

In another implementation, the power control processor adopts a modified ROLPC algorithm during an increased interference condition. More specifically, the power control processor adjusts target $E_b/N_o$ levels in a system-based, or centralized, manner instead of solely on the error rates for individual mobiles so that only a limited number of target $E_b/N_o$ levels are allowed to increase when frame erasures occur, and/or a reduced limit on how high target $E_b/N_o$ levels for all or a group of served mobiles may be adjusted is imposed when an increased interference condition occurs. By preventing target $E_b/N_o$ level increases, at least temporarily, when frame erasures occur, and/or imposing a reduced limit on how high target $E_b/N_o$ levels for all or a group of served mobiles may be adjusted, a percentage of power up-adjust commands are avoided. Therefore, a similar effect to that achieved by the modified RILPC results. According to another implementation of the present invention, the modified RILPC algorithm is combined with the modified ROLPC algorithm to provide greater resistance to increased interference conditions.

BRIEF DESCRIPTION OF THE DRAWINGS

Other aspects and advantages of the present invention will become apparent upon reading the following detailed description, and upon reference to the drawings in which.

DETAILED DESCRIPTION

The present invention is a system and a method for reverse link power control in a wireless communications network which constrains abrupt interference rises and power control instability by adopting a system-based, or centralized, power control algorithm when an increased interference condition is detected, such that call quality for an individual mobile(s) is allowed to degrade so that overall system quality can be maintained. In one embodiment, the present invention is a power control processor of a wireless network base station, such as a CDMA base station, which adopts a modified RILPC and/or a modified ROLPC algorithm upon detecting the increased interference condition. An illustrative embodiment of a reverse link power control system and method according to the present invention is described below.

Figure 1:
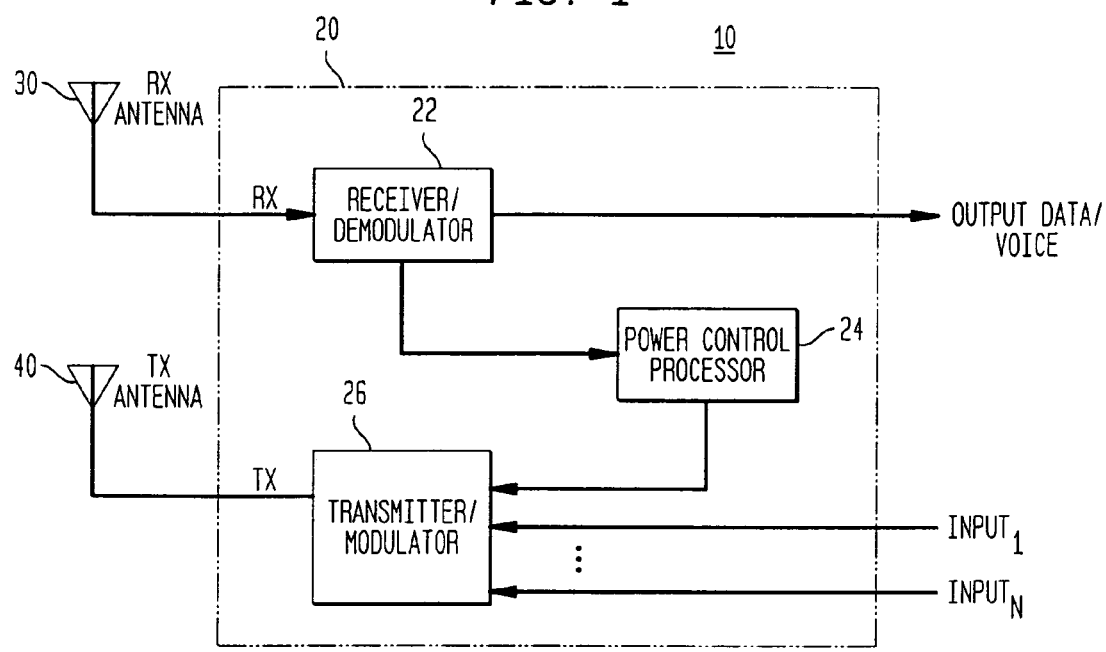
FIG. 1 is a general block diagram of an exemplary base station transmitter/receiver suitable for implementing embodiments of the present invention.

Referring to FIG. 1, there is shown a general block diagram of a transmitter/receiver 20 of a base station 10 suitable for implementing embodiments of the present invention. As shown in FIG. 1, the transmitter/receiver 20 of base station 10 includes a receiver/demodulator unit 22, a power control processor 24, and a transmitter/modulator unit 26. The receiver/demodulator unit 22 receives an RF signal, Rx, from a reception antenna 30 of the base station 10, and recovers data/voice traffic from Rx, for example using well known techniques such as band-pass filtering, low noise amplification, spread spectrum processing, frequency down-conversion, demodulation, and error correction to recover data/voice traffic from mobiles being served by the base station 10.

The transmitter/modulator 26 receives a plurality of base-band communication signals $input_1 \ldots, input_N$, including for example voice/data traffic and control information, e.g., pilot, paging, and synchronization signals, to be transmitted to mobiles being served by the base station 10. The transmitter/modulator unit 26 also receives power adjust command bits for each mobile being served from the power control processor 24, and generates an RF transmission signal, Tx, to be transmitted by a transmit antenna 40 of the base station 10, for example using well known techniques such as convolutional encoding, spread spectrum processing, and RF carrier signal modulation.

The power control processor 24 receives a plurality of measurements from the receiver/demodulator unit 22 which the power control processor 24 utilizes to generate power adjust commands for each mobile being served and to detect the onset of an increased interference condition, including $E_b/N_o$ measurements and frame erasure information for each mobile being served and RSSI values. In accordance with an embodiment of the present invention, the power control process 24 utilizes a system-based, or centralized, power control algorithm when it detects an increased interference condition, whereby call quality for an individual mobile(s) is allowed to degrade so that overall system quality may be maintained.

The operation of the power control processor 24 for generating power adjust commands in accordance with the present invention will next be described with reference to the flow diagrams of FIGS. 2–4. It should be realized that the power control processor 24 may be realized as a general purpose computer which executes software for performing the operations detailed below or as dedicated hardware, such as dedicated logic circuitry.

Figure 2:
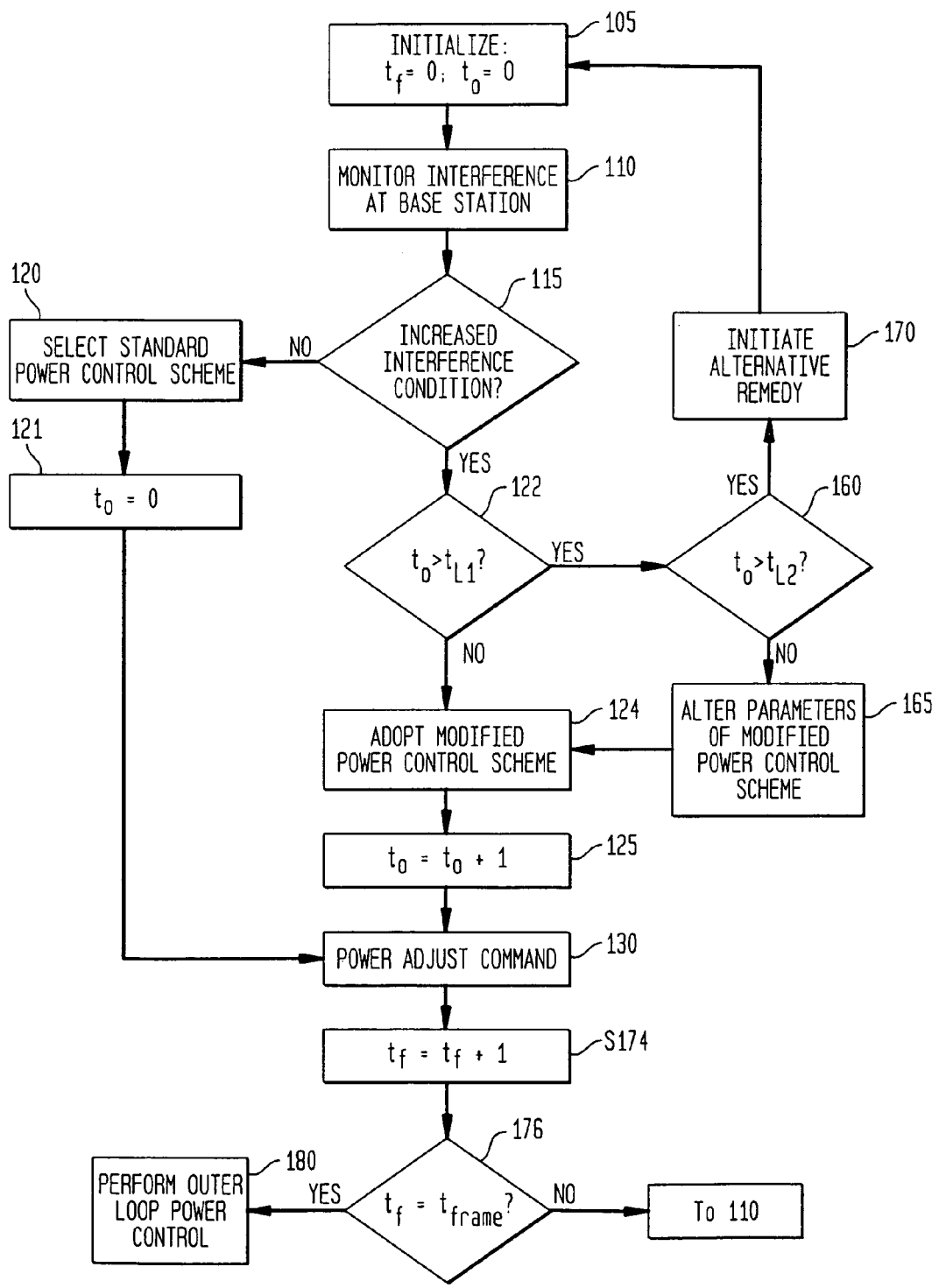
FIG. 2 is a flow diagram illustrating a reverse link power control algorithm executed by the base station transmitter/receiver according to embodiments of the present invention.

Referring to FIG. 2, the power control processor 24 initially sets both a time frame index value, $t_f$, and an interference condition time index, $t_o$, to 0 (Step 105). As described below, $t_f$ is used to indicate when a frame period (e.g., 20 milliseconds) has expired, and, thus, when ROLPC should be performed. As also described below, $t_o$ is used to indicate how long an increased interference condition has persisted, and, thus, when parameters of the modified RILPC and/or modified ROLPC algorithms should be altered, or when an alternative remedy should be initiated.

Next, the power control processor 24 monitors base station interference levels (Step 110), and determines whether an increased interference condition exists (Step 115). In this way, the power control processor 24 recognizes the onset or continuation of an increased interference condition. The power control processor 24 may recognize an increased interference condition in various ways. For example, one approach is based on an absolute measure of reverse link interference, whereby total reverse link RSSI is compared with a threshold which is set to a level (e.g., approximately 6 dB or more) above a nominal noise floor. Another approach is based on a time-differential measure of reverse link interference, whereby average RSSI over a time window (e.g., 1–500 frames) is monitored and samples of average RSSSI are taken periodically to detect increases. If an increase of average RSSI exceeds a threshold (e.g., 6 dB–12 dB), an increased interference is detected. Yet another approach is to monitor the ratio of the total number of power up-adjust commands over a time window (e.g., 1–20 frames) to the total number of power adjust commands (i.e., up-adjusts+down-adjusts) over the same time window. If the ratio is above a threshold (e.g., 0.7 or greater), an increased interference is detected. Yet another approach is to monitor any significant $E_b/N_o$ reduction for a large percentage of active users over a specified period of time. One having ordinary skill in the art will readily recognize that other approaches may be utilized to detect the onset of an increased interference condition.

When the power control processor 24 determines at Step 115 that an increased interference condition does not exist, a conventional RILPC algorithm, e.g., as described in the "Background of the Invention" portion of this disclosure, is selected (Step 120), $t_o$ is set equal to 0 (Step 121), and power up-adjust and power down-adjust commands are generated in the conventional manner (Step 130). When the power control processor 24 determines at Step 115 that an increased interference condition does exist, $t_o$ is compared to a first time threshold, $t_{L1}$ (Step 122), to indicate whether the increased interference condition has persisted longer than $t_{L1}$ (e.g., $t_{L1}$ being 1–20 frames). When $t_o$ is not greater than $t_{L1}$, the power control processor 24 adopts a modified RILPC algorithm (Step 124) so that power adjust commands are generated at Step 130 in a manner which takes into account overall performance instead of solely on an individual mobile basis, and increments $t_o$ by 1 (Step 125).

Figure 3:
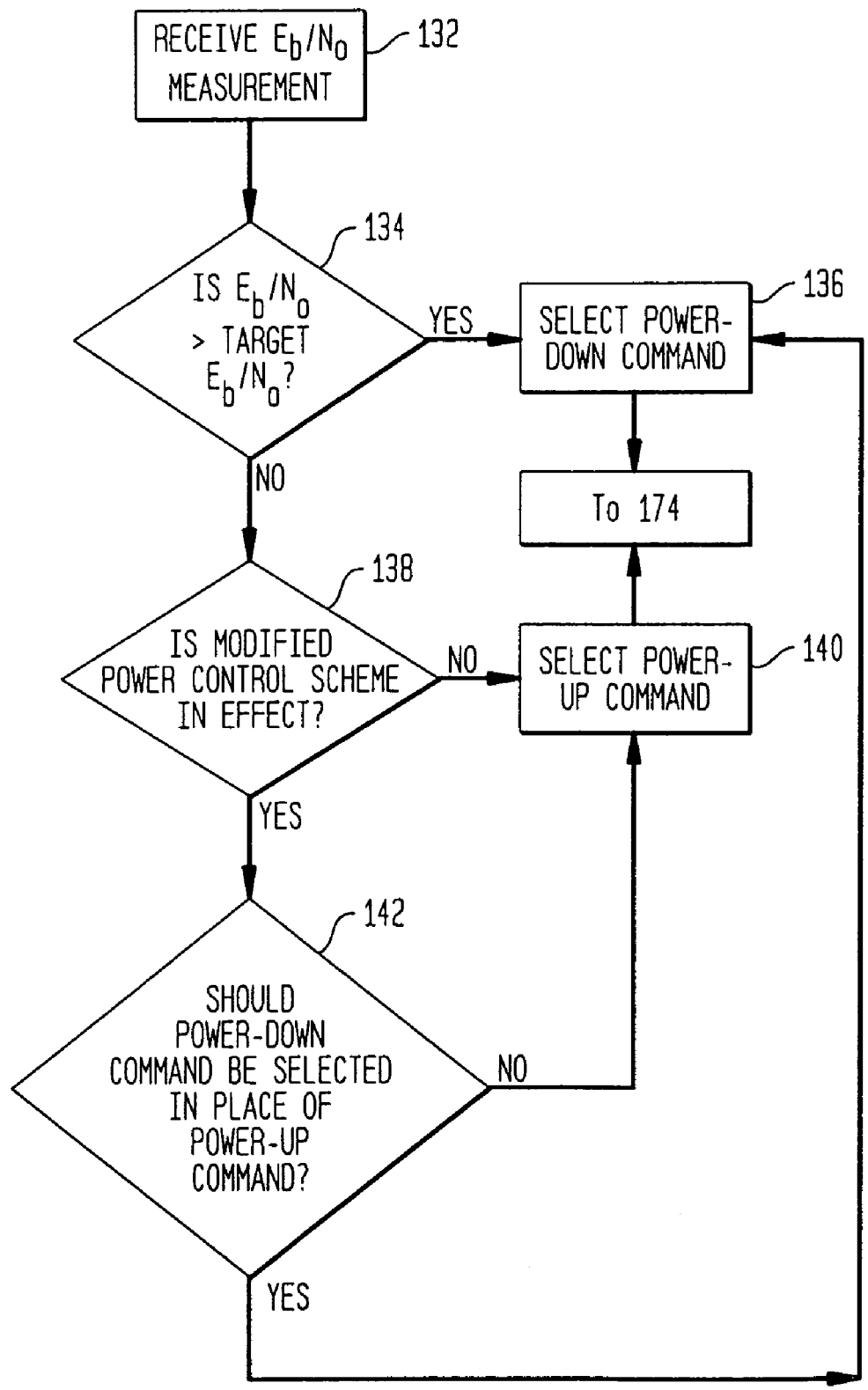
FIG. 3 is a flow diagram illustrating steps for generating power adjust commands according to an embodiment of the present invention.

FIG. 3 illustrates the steps of a RILPC algorithm for generating power adjust commands at Step 130 according to one implementation of the present invention. After obtaining an $E_b/N_o$ measurement (Step 132), the power control processor 24 compares $E_b/N_o$ with a target $E_b/N_o$ level (Step 134) to indicate whether reverse link call quality for the corresponding mobile is adequate. When $E_b/N_o$ exceeds the target $E_b/N_o$ level (indicating adequate call quality), the power control processor 24 generates a power down-adjust command (Step 136), and the algorithm proceeds to Step 174 illustrated in FIG. 2. When, on the other hand, $E_b/N_o$ is not greater than the target $E_b/N_o$ level (indicating inadequate call quality), the power control processor 24 determines whether the modified RILPC algorithm is in effect (Step 138). If the modified RILPC algorithm is not in effect, the power control processor 24 generates a power up-adjust command (Step 140), and the algorithm proceeds to Step 174 illustrated in FIG. 2. When the modified RILPC algorithm has been adopted, the power control processor 24 determines whether a power down-adjust command should be selected in place of a power up-adjust command, i.e., whether a power up-adjust command for a corresponding mobile should be "converted" to a power down-adjust command (Step 142). Such a determination may be based on statistical probabilities. For example, a percentage (e.g., initially 20%) of power up-adjust commands may be randomly converted to power down-adjust commands, and the probability of such a conversion may gradually increase based on the severity of the increased interference condition or on how long the increased interference condition has persisted until the conversion probability is 100%. Alternatively, the initial conversion probability may be set to 100%, and then gradually decreased as the increased interference condition eases. In other words, the probability may dynamically change during the increased interference condition.

When the power control processor 24 determines at Step 142 that a power adjust command conversion should occur, a power down-adjust command is selected at Step 136, and the algorithm proceeds to Step 174 shown in FIG. 2. On the other hand, when the power control processor 24 determines at Step 142 that no conversion should occur, the power control processor 24 generates a power-up adjust command at Step 140, and the algorithm proceeds to Step 174 shown in FIG. 2.

Referring again to FIG. 2, when $t_o$ exceeds $t_{L1}$, the power control processor 24 determines whether $t_o$ is greater than a second time threshold, $t_{L2}$ (Step 160). When $t_o$ exceeds $t_{L2}$, this indicates that the modified power control techniques are not adequately constraining the increased interference condition, thereby indicating that an alternative remedy should be initiated (Step 170). For example, the power control processor 24 may initiate a handdown operation in which a mobile(s) is instructed to switch from digital service to analog service (assuming a dual mode network which provides both digital and analog service), or switch to a different transmit/receive frequency channel (assuming such an alternative frequency channel is available to the base station). After the alternative remedy has achieved a normal interference condition, initialization is again performed at Step 105.

When $t_o$ does not exceed $t_{L2}$, signifying that the increased interference condition has persisted, but not the point where an alternative remedy is required, the power control processor 24 modifies parameters of the power control algorithm. For example, the probability for converting power up-adjust commands to power down-adjust commands at Step 142 may be increased or decreased each time $t_o$ increases beyond $t_{L1}$ as discussed above.

After power adjust commands are generated at Step 130, $t_f$ is incremented by 1 (Step 174) and compared with a value $t_{frame}$ to indicate whether a frame period has expired (Step 176). As discussed above, power adjust commands are generated on a sub-frame basis (e.g., 16 power adjust commands per frame). In accordance with outer loop power control, however, target $E_b/N_o$ targets are adjusted on a frame-by-frame basis. Therefore, when the power control processor 24 determines at Step 176 that $t_f$ does not equal $t_{frame}$, the processing returns to Step 110 for generating a next power adjust command. On the other hand, when $t_f$ equals $t_{frame}$, outer loop power control is performed (Step 180) to adjust target $E_b/N_o$ levels.

Figure 4:
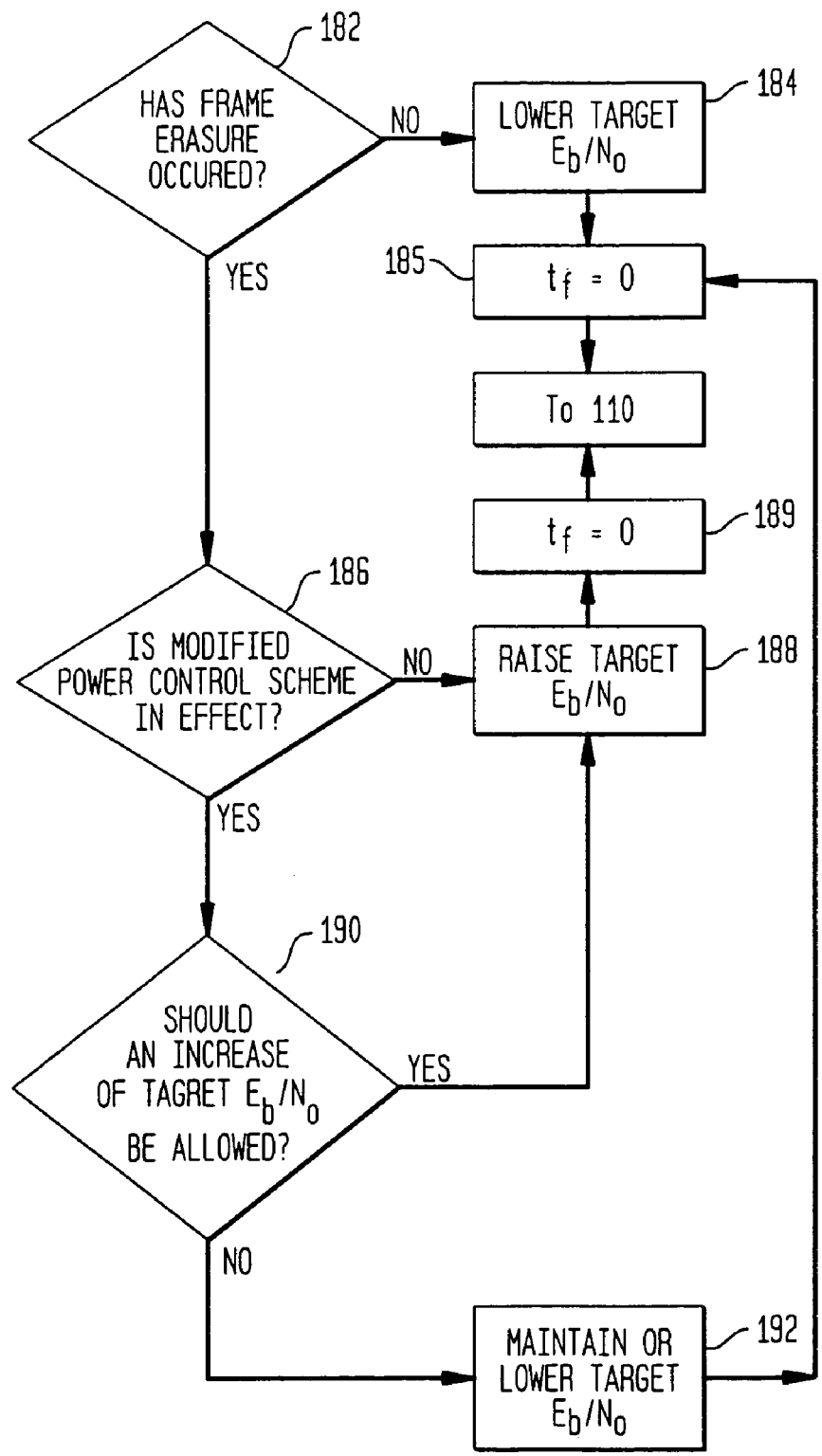
FIG. 4 is a flow diagram illustrating reverse outer loop power control in accordance with an embodiment of the present invention.

FIG. 4 is a flow diagram illustrating outer loop power control in accordance with one implementation of the present invention. Initially, the power control processor 24 determines whether a frame erasure has occurred (Step 182), and, if not, lowers the target $E_b/N_o$ level for the corresponding mobile (184), resets $t_f$ to 0 (Step 185), and returns to Step 110 to perform RILPC. When a frame erasure has occurred, however, the power control processor 24 recognizes whether the modified power control scheme is in effect (i.e., as indicated by the determination at Step 115). When the modified power control scheme is not in effect, the power control processor 24 increases the target $E_b/N_o$ level for the corresponding mobile (Step 188), resets $t_f$ to 0 (Step 185), and returns to Step 110 to perform RILPC. When the modified power control scheme is in effect, the power control processor 24 determines whether the target $E_b/N_o$ level for the corresponding mobile should be allowed to increase (Step 190). For example, a probability may be assigned for allowing target $E_b/N_o$ levels to increase such that, even when a frame erasure has occurred, target $E_b/N_o$ levels may stay the same or actually be decreased (Step 192) instead of increased (Step 188). After maintaining or decreasing target $E_b/N_o$ levels at Step 192, $t_f$ is reset to 0 (Step 185), and the power control algorithm returns to Step 110 to perform RILPC. By maintaining or decreasing, instead of increasing, target $E_b/N_o$ levels, even when frame erasers occur, the power control processor 24 will generate fewer power up-adjust commands during RILPC, thereby containing increases in interference.

When determining whether to allow an increase in a mobile's target $E_b/N_o$, the recent frame error history of the mobile may be considered such that, for example, an increase in a mobile's target $E_b/N_o$ is allowed when consecutive frame erasures for the corresponding mobile have occurred. Again, the procedure of Step 165 may be utilized to alter the probabilities of allowing an increase in target $E_b/N_o$ levels depending on the difference between $t_o$ and $t_{L1}$.

As an alternative, or in addition to, the modified ROLPC algorithm described above, the power control processor 24 may impose a reduced limit on how high target $E_b/N_o$ levels for all or a group of served mobiles may be increased when an increased interference condition occurs.

Although the implementation described above with reference to the flow diagrams of FIGS. 2–4 relied on a combination of a modified RILPC algorithm and a modified ROLPC algorithm, it should be realized that one of the modified RILPC algorithm and the modified ROLPC algorithm may be used as an alternative implementation. Furthermore, another alternative implementation may utilize only one of the modified RILPC algorithm and the modified ROLPC algorithm at the outset of an increased interference condition, and utilize both the modified RILPC algorithm and the modified ROLPC algorithm when the increased interference condition is severe or persists longer than a time threshold. As yet another mechanism for controlling an increased interference condition, target frame error rates may be increased during an increased interference condition, and/or accelerated power down-adjust commands may be utilized.

By adopting a modified power control scheme, such as any one or a combination of multiple techniques described above, which operates in a centralized manner by taking overall performance into account when an increased interference condition has been detected, interference "runaway" is avoided, and reverse link coverage and overall service quality is maintained.

It should be apparent to this skill in the art that various modifications and applications of this invention are contemplated which may be realized without departing from the spirit and scope of the present invention.

What is claimed is:

1. A power control system for generating transmit power adjust commands in a wireless communications network, comprising:

detection means for detecting interference conditions; and generating means for generating power adjust commands when said detection means detects an increased interference condition; and converting means for converting power up-adjust commands to power down-adjust commands when the detection means detects an increased interference condition and a duration of said detected increased interference condition does not exceed a first time threshold.

2. The power control system of claim 1, further configured for:

comparing a signal-to-interference measurement for a mobile with a target signal-to-interference level for the mobile;

generating a power down-adjust command when the signal-to-interference measurement for the mobile is greater than the target signal-to-interference level for the mobile; and determining whether to generate a power down-adjust command when the signal-to-interference measurement for the mobile is less than the target signal-to-interference level for the mobile.

3. The power control system of claim 2, further configured for:

judging whether an erasure frame has been received for the mobile; and determining whether to adjust the target signal-to-interference level for the mobile when an erasure frame has been received for the mobile.

4. The power control system of claim 2, wherein said power control system determines whether to generate a power down-adjust command when the signal-to-interference measurement for the mobile is less than the target signal-to-interference level for the mobile based on a statistical probability.

5. The power control system of 4, wherein the statistical probability is variable.

6. The power control system of claim 1, further configured for:

generating a power adjust command based on a comparison of a signal-to-interference measurement for the mobile and a target signal-to-interference level for the mobile;

judging whether an erasure frame has been received for the mobile; and determining whether to adjust the target signal-to-interference level for the mobile when an erasure frame has been received for the mobile.

7. The power control system of claim 6, wherein said power control system determines whether to adjust the target signal-to-interference level for the mobile when an erasure frame has been received for the mobile based on a statistical probability.

8. The power control system of claim 7, wherein the statistical probability is variable.

9. The power control system of claim 1, wherein said detection means monitors changes in total reverse link signal strength.

10. The power control system of claim 1, wherein said detection means monitors a ratio of power up-adjust commands to power down-adjust commands.

11. The power control system of claim 1, wherein said detection means monitors signal-to-interference levels for a plurality of mobiles.

12. The power control system of claim 1, wherein said detection means monitors total reverse link signal strength.

13. The power control system of claim 1, wherein the converting means is configured to convert a percentage of the power up-adjust commands to power down-adjust commands and dynamically modify the percentage.

14. The power control system of claim 13, wherein the converting means is configured to modify a number of the power up-adjust commands converted to power down-adjust commands when the duration of the detected increased interference condition exceeds the first time threshold and does not exceed a second time threshold.

15. The power control system of claim 13, wherein the power control system is configured to perform one of (i) a handdown operation and (ii) switching to a different transmit/receive frequency channel when the duration of the detected increased interference condition exceeds a second time threshold.

16. The power control system of claim 1, wherein the detection means for detecting interference conditions uses the first time threshold and a second time threshold.

17. A method for generating transmit power adjust commands in a wireless communications network comprising:
  detecting interference conditions;
  selecting a first power control scheme when said detecting step does not detect an increased interference condition;
  selecting a second power control scheme when said detecting step detects an increased interference condition; and
  generating power adjust commands based on the selected power control scheme; and
  converting power up-adjust commands to power down-adjust commands when detecting an increased interference condition and a duration of said detected increased interference condition does not exceed a first time threshold.

18. The method of claim 17, wherein the second power control scheme is a modified reverse inner loop power control scheme.

19. The method of claim 17, wherein the second power control scheme is a modified reverse outer loop power control scheme.

20. The method of claim 17, further comprising:
  modifying a number of the power up-adjust commands converted to power down-adjust commands in the converting step when the duration of the detected increased interference condition exceeds the first time threshold and does not exceed a second time threshold.

21. The method of claim 20, further comprising:
  performing one of (i) a handdown operation and (ii) switching to a different transmit/receive frequency channel when the duration of the detected increased interference condition exceeds the second time threshold.

22. The method of claim 17, wherein the detecting step detects interference conditions using the first time threshold and a second time threshold.

23. A power control system for generating power adjust commands in a wireless communications network, comprising:
  detection means for detecting interference conditions;
  selecting means for selecting a first power control scheme when said detection means does not detect an increased interference condition and selecting a second power control scheme when said detection means detects an increased interference condition;
  generating means for generating power adjust commands based on the power control scheme selected by said selecting means; and
  converting means for converting power up-adjust commands to power down-adjust commands when detecting an increased interference condition and a duration of said detected increased interference condition does not exceed a first time threshold.

24. The power control system of claim 23, wherein the second power control scheme is a modified reverse inner loop power control scheme.

25. The power control system of claim 23, wherein the second power control scheme is a modified reverse outer loop power control scheme.

26. The power control system of claim 23, wherein the converting means is configured to convert a percentage of the power up-adjust commands to power down-adjust commands and dynamically modify the percentage.

27. The power control system of claim 26, wherein the converting means is configured to modify a number of the power up-adjust commands converted to power down-adjust commands when the duration of the detected increased interference condition exceeds the first time threshold and does not exceed a second time threshold.

28. The power control system of claim 26, wherein the power control system is configured to perform one of (i) a handdown operation and (ii) switching to a different transmit/receive frequency channel when the duration of the detected increased interference condition exceeds the second time threshold.

29. The method of claim 23, wherein the detection means for detecting interference conditions uses the first time threshold and a second time threshold.

30. A method for generating transmit power adjust commands in a wireless communication network comprising:
  detecting interference conditions; and
  converting power up-adjust commands to power down-adjust commands when detecting an increased interference condition and a duration of said detected increased interference condition does not exceed a first time threshold.

31. The method of claim 30, wherein the converting is based upon statistical probabilities.

32. The method of claim 30, wherein the converting converts a percentage of power up-adjust commands to power down-adjust commands.

33. The method of claim 30, wherein the percentage of power up-adjust commands converted to power down-adjust commands is predetermined.

34. The method of claim 32, further comprising:
  dynamically modifying the percentage.

35. The method of claim 34, wherein the dynamically modifying comprises: adjusting the percentage based upon at least one of (i) a level of the increased interference condition and (ii) a duration of the increased interference condition.

36. The method of claim 30, further comprising:
  modifying a number of the power up-adjust commands converted to power down-adjust commands in the converting step when the duration of the detected increased interference condition exceeds the first time threshold and does not exceed a second time threshold.

37. The method of claim 36, wherein the number is a percentage value and the modifying step comprises:
  adjusting the percentage value based upon at least one of (i) a level of the increased interference condition and (ii) a duration of the increased interference condition.

38. The method of claim 36, further comprising:
  performing one of (i) a handdown operation and (ii) switching to a different transmit/receive frequency channel when the duration of the detected increased interference condition exceeds the second time threshold.

39. The method of claim 30, wherein the detecting step detects interference conditions using the first time threshold and a second time threshold.

40. The method of claim 30, further comprising:
  comparing a signal-to-interference measurement for a mobile with a target signal-to-interference level for the mobile;
  generating a power down-adjust command when the signal-to-interference measurement for the mobile is greater than the target signal-to-interference level for the mobile; and
  determining whether to generate a power down-adjust command when the signal-to-interference measurement for the mobile is less than the target signal-to-interference level for the mobile.

41. The method of claim 40, wherein said determining step determines whether to generate a power down-adjust command when the signal-to-interference measurement for the mobile is less than the target signal-to-interference level for the mobile based on a statistical probability.

42. The method of claim 41, wherein the statistical probability is variable.

43. The method of claim 40, comprising:
judging whether an erasure frame has been received for the mobile; and
determining whether to adjust the target signal-to-interference level for the mobile when an erasure frame has been received for the mobile.

44. The method of claim 30, further comprising:
generating power adjust commands based on a comparison of a signal-to-interference measurement for a mobile and a target signal-to-interference level for the mobile;
judging whether an erasure frame has been received for the mobile; and
determining whether to adjust the target signal-to-interference level for the mobile when an erasure frame has been received for the mobile.

45. The method of claim 44, wherein said determining step determines whether to adjust the target signal-to-interference level for the mobile when an erasure frame has been received for the mobile based on a statistical probability.

46. The method of claim 45, wherein the statistical probability is variable.

47. The method of claim 30, wherein said detecting step monitors changes in total reverse link signal strength at a base station.

48. The method of claim 30, wherein said detecting step monitors absolute total reverse link signal strength.

49. The method of claim 30, wherein said detecting step monitors a ratio of power up-adjust commands to total power adjust commands.

50. The method of claim 30, wherein said detecting step monitors signal-to-interference levels for a plurality of mobiles.

* * * * *